United States Patent [19]

Huddleston

[11] Patent Number: 5,202,035
[45] Date of Patent: * Apr. 13, 1993

[54] LIQUID ALUMINUM PHOSPHATE SALT GELLING AGENT

[75] Inventor: David A. Huddleston, Sugar Land, Tex.

[73] Assignee: Nalco Chemical Company, Naperville, Ill.

[*] Notice: The portion of the term of this patent subsequent to Oct. 15, 2008 has been disclaimed.

[21] Appl. No.: 834,685

[22] Filed: Feb. 12, 1992

Related U.S. Application Data

[62] Division of Ser. No. 552,974, Jul. 16, 1990, Pat. No. 5,110,485.

[51] Int. Cl.$^5$ .............................................. E21B 43/26
[52] U.S. Cl. ............................. 252/8.551; 252/315.1; 166/283
[58] Field of Search ........................ 252/8.551, 315.1; 558/113, 208; 166/283

[56] References Cited

U.S. PATENT DOCUMENTS

| | | | |
|---|---|---|---|
| 3,334,978 | 8/1967 | Revukas | 44/69 |
| 3,338,935 | 8/1967 | Kerschner et al. | 260/429.5 |
| 3,494,949 | 2/1970 | Monroe et al. | 260/448 |
| 3,575,859 | 4/1971 | Monroe | 252/32.5 |
| 3,757,864 | 9/1973 | Crawford et al. | 166/308 |
| 4,007,128 | 2/1977 | Poklacki | 252/316 |
| 4,104,173 | 8/1978 | Gay et al. | 252/316 |
| 4,152,289 | 5/1979 | Griffin, Jr. | 252/8.551 X |
| 4,153,649 | 5/1979 | Griffin, Jr. | 252/8.551 X |
| 4,172,283 | 11/1979 | Griffin, Jr. | 252/8.551 |
| 4,200,539 | 4/1980 | Burnham et al. | 252/8.55 R |
| 4,316,810 | 2/1982 | Burnham | 252/8.551 |
| 4,473,408 | 9/1984 | Purinton, Jr. | 252/315.1 X |
| 4,507,213 | 3/1985 | Daccord et al. | 252/8.551 |
| 4,537,700 | 8/1985 | Purinton, Jr. | 252/8.551 |
| 4,622,155 | 11/1986 | Harris et al. | 252/8.551 |
| 4,781,845 | 11/1988 | Syrinek et al. | 252/8.551 |
| 4,787,994 | 11/1988 | Thorne et al. | 252/8.551 X |
| 4,877,894 | 10/1989 | Huddleston | 558/113 |
| 5,057,233 | 10/1991 | Huddleston | 252/8.551 |

FOREIGN PATENT DOCUMENTS

| | | | |
|---|---|---|---|
| 974539 | 9/1975 | Canada | 260/460.5 |
| 0225661 | 6/1987 | European Pat. Off. | |
| 3247758 | 7/1983 | Fed. Rep. of Germany | |

OTHER PUBLICATIONS

Hochwalt et al., "Alkyl Esters of Phosphoric Acid." Industrial and Engineering Chemistry, (Jan., 1942), pp. 20-25.

Primary Examiner—Gary L. Geist
Attorney, Agent, or Firm—Ailes, Ohlandt & Greeley

[57] ABSTRACT

A liquid aluminum phosphate salt gelling agent comprising the reaction product of: a dialkyl phosphate formed from the reaction product of (1) a polyphosphate intermediate produced by reacting triethyl phosphate and phosphorous pentoxide and (2) a mixture of aliphatic alcohols having 6 to 10 carbons in their alkyl groups; an aluminum sulfate; and a solvent.

5 Claims, No Drawings

LIQUID ALUMINUM PHOSPHATE SALT GELLING AGENT

This is a division, of application Ser. No. 07/552,974, filed Jul. 16, 1990 now U.S. Pat. No. 5,110,485.

The present invention relates to a novel liquid aluminum phosphate salt gelling agent comprising the reaction product of: a dialkyl phosphate formed from the reaction product of (1) a polyphosphate intermediate produced by reacting triethyl phosphate and phosphorous pentoxide and (2) a mixture of aliphatic alcohols having 6 to 10 carbons in their alkyl group; an aluminum sulfate; and a solvent. This unique gelling agent permits "on the fly" gelling of hydrocarbons, especially those used in hydraulic fracturing of subterranean formations to enhance oil and gas production.

BACKGROUND OF THE INVENTION

Hydraulic fracturing is a widely used method for stimulating oil and/or gas production. In performing a fracturing operation, a hydraulic fluid, usually a liquid hydrocarbon, is pumped into the well bore at sufficiently high pressure to fracture the surrounding rock formation to open cracks in the formation through which oil and/or gas can flow into the well bore. Since the cracks which are opened by the fracturing fluid tend to close once the pressure on the fluid is released, it is customary to inject into the well along with the fracturing fluid a suitable particulate proppant material such as sand. The small proppant particles flow into the fractures created in the formation along with the fracturing fluid and serve to prop the fracture open after the fluid pressure is released.

Proppant materials may be either lighter or heavier than the hydraulic fracturing fluid and thus may tend to float or settle out of the fluid prematurely, or otherwise be unevenly distributed in the fracturing fluid. To overcome this problem, it is customary practice to use gelled fracturing fluids which will hold the proppant material in suspension as the fluid flows down the well bore and out into the formation fractures. This requires that the gelled fracturing fluid be of sufficient viscosity to hold the proppant material suspended in a slurry or matrix. At the same time, the fluid must not be so viscous that it cannot be readily pumped into the well bore and out into the formation fractures.

Various materials are known which, when admixed with hydrocarbons, will create hydrocarbon gels of various viscosities. However, many of these materials are not suitable for use as hydrocarbon fracturing fluids because of the particular requirements imposed by the environment in which they are used. The gels must be formed at or near the wellhead at ambient temperature. Generally, several thousand gallons of normally liquid hydrocarbon such as crude or refined oil, a gelling agent and an activator are blended to form a gel. This mixture then is stored in frac tanks until used.

An ideal gelling agent for forming a gelled hydrocarbon fracturing fluid would be one which, when mixed with the normally liquid hydrocarbon and an activator, forms a gel of sufficient viscosity to hold the proppant in suspension relatively quickly and then retains its desired range of viscosity for at least several hours at ambient temperatures. At the same time, the gel should, when injected into downhole formations at temperatures of 200–250° C., retain sufficient viscosity to keep the proppant in suspension for the period of time required for the fracturing operation, which may be up to eight hours.

Even more preferable would be a gelling agent and activator which can be mixed with a liquid hydrocarbon "on the fly", i.e., as the constituents are being pumped into the well bore, wherein the hydrocarbon is gelled almost immediately. Such a gelling agent and activator would eliminate premixing and storage of the gel in a frac tank prior to use, as well as significantly reduce the need to maintain the viscosity of the gel at ambient temperature for any prolonged period. The present inventor undertook the task of developing just such a gelling agent capable of "on the fly" gelling of hydrocarbons.

Historically, the art of gelling organic liquids, e.g., hydrocarbons, for oil field fracturing purposes has involved introducing a phosphate ester and an aluminum source into the organic liquid. The in situ reaction between the phosphate ester and the aluminum source forms an aluminum phosphate ester which, in turn, gels the hydrocarbon.

Early phosphate esters were made by reacting a mixture of alcohols, such as ethyl, octyl, and decyl alcohols, with $P_2O_5$ (phosphorous pentoxide). The resulting product was a mixture of the corresponding mono- and di- phosphate esters. These and similar phosphate esters were termed "gelling agent" by the oil field industry.

Various conventional gelling agents are set forth in the following patents and application: (Poklacki) U.S. Pat. No. 4,007,128, issued Feb. 8, 1977; (Monroe) U.S. Pat. No. 3,575,859, issued Apr. 20, 1971; (Huddleston) U.S. Pat. No. 4,877,894, issued Oct. 31, 1989; (Burnham et al.) U.S. Pat. No. 4,200,539, issued Apr. 29, 1980; (Monroe) U.S. Pat. No. 3,494,949, issued Feb. 10, 1970; (Gay et al.) U S. Pat. No. 4,104,173, issued Aug. 1, 1978; (Crawford et al.) U.S Pat. No. 3,757,864, issued Sep. 11, 1973; and European patent application Publication No. 0 225 661, published Jun. 16, 1987.

U.S. Pat. Nos. 4,007,128, 3,575,859, 3,494,949, 4,104,173, 4,200,539 and 3,757,864 all disclose various gelling agents which include salts of alkyl orthophosphates. In particular, U.S. Pat. No. 4,007,128 provides a partial salt of aluminum alkyl orthophosphates (gelling agent) and a neutralizing amount of polyamine (activator) which retain gel character in the presence of epoxy resins and aromatic diamines. The gelling agent according to this patent is formed from the reaction product of (A) an alkyl acid orthophosphate which is produced from alcohols and phosphorous pentoxide, and (B) a basic aluminum compound, e.g., hydrated alumina or aluminum isopropoxide.

U.S. Pat. No. 3,575,859 discloses the gelling of hydrocarbons with small amounts of metal alkyl oleyl orthophosphates (gelling agent) and amines (activator). The gelling agent is formed from the reaction product of (A) ethyl oleyl orthophosphoric mono acid, i.e., a dialkyl phosphate mono acid, and (B) a metal base, e.g., aluminum, gallium or lanthanum hydroxide. Oleyl is a $C_{18}$ alkenyl radical.

U.S. Pat. No. 3,494,949 relates to the improvement of the viscosity of motor oils via the addition of aluminum salts of alkyl orthophosphates. A precipitate of aluminum ethyl oleyl orthophosphate is formed from the reaction product of (A) ethyl oleyl orthophosphate with water and ethanol, (B) sodium hydroxide, and (C) aluminum sulfate.

U.S. Pat. No. 4,104,173 is directed to a gelling agent of pseudo double salts of alkyl orthophosphates. These gelling agents are formed from the reaction product of (A) a mixture of alkanol and/or alkenols and phosphorous pentoxide, (B) a first base, i.e., sodium aluminate or hydrated aluminum oxide, and (C) a second base, i.e., sodium hydroxide.

U.S. Pat. No. 4,200,539 discloses a gelling agent formed from the reaction product of (A) phosphorous pentoxide and an aliphatic alcohol, and (B) an aluminum compound selected from the group consisting of alkali metal aluminate, aluminum isopropoxide, and aluminum hydroxide.

U.S. Pat. No. 3,757,864 discloses a gelling agent of aluminum salts of aliphatic orthophosphate ester formed from the reaction product of (A) orthophosphoric acid ester, (B) phosphorous pentoxide, and (C) a basic aluminum compound, e.g., sodium aluminate, aluminum isopropoxide or hydrated alumina.

European Patent Publication No. 0 225 661 is directed to raising the viscosity of a hydrocarbon by the addition of a phosphate ester and metallic salts which are substantially completely free of water and pH affecting substances. The phosphate ester gelling agent is formed from the reaction product of (A) a phosphate triester and phosphorous pentoxide, and (B) an alcohol. The metal salt activator is typically metal alkoxide or aluminum isopropoxide.

Well operators have been seeking a gelling agent product that is easily pumpable, could be diluted if necessary, and would gel rapidly "on the fly". The aforementioned conventional gelling agents are unable to meet those requirements. Aluminum complexes or salts from aluminum isopropoxide or alumina are not satisfactory because they result in a precipitate, not a liquid product that could gel "on the fly".

The present inventor has discovered through extensive experimentation that the reaction product of selected dialkyl phosphates, an aluminum sulfate and a solvent results in a liquid gelling agent which may be mixed "on the fly" with hydrocarbon and an appropriate activator at or near the wellhead such that a suitable gel forms almost immediately. This unique gelling agent overcomes the disadvantages of conventional gelling agents, i.e., premixing of the fracturing fluid and storage of the gelled fluid in frac tanks.

The gelling agents of the present invention also provide the following economic benefits: (1) no residual gelled fracturing fluid, (2) no disposal of residual gelled fracturing fluid, (3) requires smaller dosages than conventional gelling agents resulting in reduced pumping friction, and (4) power consumption is substantially reduced by the lack of a premixing step and since pumping of gelled fracturing fluid from a frac tank to the wellhead is avoided.

The present invention therefore overcomes the above-mentioned deficiencies, as well as provides additional advantages which shall become apparent as described below.

SUMMARY OF THE INVENTION

The present invention provides a novel liquid aluminum phosphate salt gelling agent formed from the reaction product of: a dialkyl phosphate which is formed from the reaction product of (1) a polyphosphate intermediate produced by reacting triethyl phosphate and phosphorous pentoxide and (2) a mixture of aliphatic alcohols having 6 to 10 carbons in their alkyl groups; an aluminum sulfate; and a solvent.

The aluminum sulfate is preferably aluminum sulfate hydrate and the solvent is preferably toluene, xylene, aromatic naphtha or blends thereof. The molar ratio of phosphates to aluminum is preferably in the range between about 6:1 to 3.2:1.

It is also an object of the present invention to provide a method for treating a liquid hydrocarbon which comprises adding: a liquid aluminum phosphate salt gelling agent comprising the reaction product of (a) dialkyl phosphate formed from the reaction product of (1) a polyphosphate intermediate produced by reacting triethyl phosphate and phosphorous pentoxide and (2) a mixture of aliphatic alcohols having 6 to 10 carbons in their alkyl groups, (b) an aluminum sulfate, and (c) a solvent; and an activator, e.g., triethanolamine.

An additional object is a method of fracturing an oil well which comprises pumping (A) a liquid hydrocarbon; (B) a liquid aluminum phosphate salt gelling agent comprising the reaction product of: dialkyl phosphate formed from the reaction product of (1) a polyphosphate intermediate produced by reacting triethyl phosphate and phosphorous pentoxide and (2) a mixture of aliphatic alcohols having 6 to 10 carbons in their alkyl groups, an aluminum sulfate, and a solvent; (C) an activator; and (D) a proppant material, into a well bore such that the gelling agent, activator and proppant are mixed with the hydrocarbon as they are pumped downhole and wherein a gelled hydrocarbon forms almost immediately; whereby premixing of the hydrocarbon, gelling agent and activator is eliminated.

The present invention may also include many additional features which shall be further described below.

DESCRIPTION OF THE PREFERRED EMBODIMENTS

The present invention employs a liquid oil soluble aluminum phosphate that can be activated with an oil soluble activator to gel hydrocarbons, e.g., diesel, kerosene, condensates, and crude oil. The gelling agent and activator are readily admixed with the hydrocarbon as they are pumped down the well bore. A suitable gel forms almost immediately, and pre-mixing and storage are eliminated. This concentrated liquid gelling agent can be mixed with hydrocarbon in smaller dosages so as to reduce pumping friction.

The liquid aluminum phosphate salt gelling agent of the present invention includes the reaction product of a dialkyl phosphate, an aluminum sulfate and a solvent, e.g., toluene, xylene, aromatic naphtha or blends thereof. The ratio of phosphates to aluminum is in the range between about 6:1 to 3.2:1.

The dialkyl phosphate is formed from the reaction product of (1) a polyphosphate intermediate produced by reacting triethyl phosphate and phosphorous pentoxide and (2) a mixture of aliphatic alcohols having 6 to 10 carbons in their alkyl groups. These and other dialkyl phosphates are set forth in detail throughout (Huddleston) U.S. Pat. No. 4,877,894, which is incorporated herein by reference. The dialkyl phosphate is present within the gelling agent in an amount between about 75-85% by molar weight.

In producing the polyphosphate intermediate, it is preferred to use from about 1.0 to about 1.3 moles of triethyl phosphate for each mole of phosphorous pentoxide, with 1.3 moles of triethyl phosphate being most preferred. Approximately three moles of mixed aliphatic alcohols for each mole of phosphorous pentoxide used are then blended with the polyphosphate intermediate.

The alcohol comprises a mixture of aliphatic alcohols having from 6 to 10 carbons in their alkyl groups. The mixed alcohol has an increased hexanol content of from about 13% to about 92% by weight of hexanol, with the remainder being divided principally between $C_8$ and $C_{10}$ alcohols. Most preferably, the mixed alcohol comprises approximately 45% by weight of hexanol, 30% by weight of octanol and 25% by weight of decanol.

The aluminum sulfate is preferably aluminum sulfate hydrate. The aluminum sulfate is present within the gelling agent in an amount between about 5-35% by weight. The water of hydration from aluminum sulfate needs to be azeotroped out with a solvent. The solvent is preferably toluene, xylene, aromatic naphtha or a similar solvent. The solvent is present within the gelling agent in an amount between about 30-90% by weight.

The dialkyl phosphates (80% yield) are typically synthesized from linear 6-10 carbon alcohols, phosphorous pentoxide, and triethyl phosphate. It is believed that this reaction results in an ethyl and fatty ($C_6$-$C_{10}$) mixed diester. These acidic phosphate diesters are converted to aluminum complexes with aluminum sulfate. It was discovered that the resultant aluminum phosphate salt remained in solution due to the acidic residue (sulfuric acid) from the aluminum sulfate. Aluminum chloride accomplishes the same liquid aluminum phosphate salt but hydrogen chloride gas is liberated and the composition changes with time. Low viscosity solutions of about 50% aluminum phosphate salt in toluene or a similar solvent were obtained.

These liquid aluminum phosphate salts gelled kerosene and similar hydrocarbons rapidly when partially neutralized with an amine activator. Triethanolamine is a particularly desirable activator due to its low volatility and availability.

A novel "on the fly" hydrocarbon gel may be produced by blending with a normally liquid hydrocarbon a gelling amount of liquid aluminum phosphate salt gelling agent and an effective amount of an activator, e.g., triethanolamine. The hydrocarbon is typically a liquid medium density petroleum fraction such as kerosene, gas oil, crude oil, or diesel. From about 3 to about 15 gallons of gelling agent preferably are utilized for each 1,000 gallons of hydrocarbon, with approximately 10 gallons of gelling agent per 1,000 gallons of hydrocarbon being most preferred.

When using the improved gelling agent to perform a well fracturing operation the gelling agent, liquid hydrocarbon, activator and proppant material are pumped simultaneously down the well bore such that the gelling agent, activator and proppant are mixed with said hydrocarbon as they are pumped downhole and wherein the gelled hydrocarbon forms almost immediately. The premixing of the hydrocarbon, gelling agent and activator is thereby eliminated. The fracturing fluid is pumped down the well bore at the desired formation fracturing pressure and out into the formation fractures. The target formation may be kept under elevated pressure for up to several hours to promote further propagation of cracks.

Once the fracturing operation is complete, the pressure on the hydraulic fracturing fluid is released. However, gelled hydrocarbon trapped in the fractures might tend to prevent production flow from the fractured formation back into the well bore. To avoid this, a neutralizing or "breaking" agent commonly is admixed with the gelled hydrocarbon as it is pumped into the well bore. The preferred breakers have a delayed neutralizing effect and thus tend to break down the hydrocarbon gel only after several hours. One suitable such breaking agent is sodium bicarbonate which may be admixed with the hydrocarbon, gelling agent, activator and proppant material in a finely granulated or powder form. It has only low solubility in the gelled hydrocarbon and therefore its neutralizing effect is suitably time delayed The following examples and experimental results will further illustrate the invention.

EXAMPLE 1

Liquid Aluminum Phosphate Salt Gelling Agent

A 4-neck reaction flask was used, equipped with a thermometer, mechanical stirrer, condenser and gas ($N_2$) inlet. 200 grams of toluene and 136 grams of triethyl phosphate were added to the flask, followed by 80.8 grams of phosphorous pentoxide under a nitrogen blanket. The reactants were heated to 80° C. for approximately two hours. Thereafter, a blend of 122.8 grams of 6-10 carbon alcohol and 89.1 grams of hexanol were added to the flask dropwise over 45 minutes at 60-80° C. The reactants were heated to 120-125° C. for approximately two hours. The reaction product was then cooled to about 90° C. 161.5 grams of aluminum sulfate hydrate and 228.7 grams of toluene were added to the flask and the nitrogen blanket was discontinued. About 73 grams of water were collected in azeotrope at 95 to about 115-120° C. Thereafter, the mixture was permitted to cool. A clear solution was produced.

EXAMPLE 2

Dialkyl Phosphate

A 4-neck reaction flask was used, equipped with a thermometer, mechanical stirrer, condenser and gas ($N_2$) inlet. 310.4 grams of triethyl phosphate and 183.9 grams of phosphorous pentoxide were added to the flask, mixed and reacted for two hours at 175° F. to produce a polyphosphate intermediate. All additions and reactions throughout the experiment were conducted under a nitrogen blanket. The polyphosphate intermediate was cooled to approximately 140° F. A mixture of 418.8 grams of 6-10 carbon alcohol and 102.1 grams of hexanol was then added dropwise to the polyphosphate intermediate while maintaining a temperature between about 140-175° F. After the alcohol blend addition, the mixture was heated at 250-260° F. for two hours. The reaction resulted in a liquid alkyl phosphate diester.

EXAMPLE 3

Liquid Aluminum Phosphate Salt Gelling Agent

A 4-neck reaction flask was used, equipped with a thermometer, mechanical stirrer, condenser and gas ($N_2$) inlet. 30.58 grams of triethyl phosphate and 18.11 grams of phosphorous pentoxide were added to the flask under a nitrogen blanket. The reactants were heated to 80° C. for approximately two hours. Thereafter, a blend of 41.25 grams of 6-10 carbon alcohol and 10.06 grams of hexanol were added to the flask dropwise over 45 minutes at 60-80° C. The reactants were then heated to 120-125° C. for approximately two hours. The reaction product was cooled to about 90° C. 31.70 grams of aluminum sulfate hydrate and 100 grams of toluene were added to the flask and the nitrogen blanket was discontinued. 14 grams of water were collected in azeotrope at 95 to about 115–120° C. Thereafter, the mixture was permitted to cool. A clear solution was produced.

EXAMPLE 4

Dialkyl Phosphate

A 4-neck reaction flask was used, equipped with a thermometer, mechanical stirrer, condenser and gas ($N_2$) inlet. 27.96 grams of triethyl phosphate and 21.78 grams of phosphorous pentoxide were added to the flask, mixed and reacted for two hours at 175° F. to produce a polyphosphate intermediate. All additions and reactions throughout the experiment were conducted under a nitrogen blanket. The polyphosphate intermediate was cooled to approximately 140° F. A mixture of 8.22 grams of 6–10 carbon alcohol and 42.04 grams of hexanol was then added dropwise to the polyphosphate intermediate while maintaining a temperature between about 140–175° F. After the alcohol blend addition, the mixture was heated at 250–260° F. for two hours. The reaction resulted in a liquid alkyl phosphate diester.

EXAMPLE 5

Liquid Aluminum Phosphate Salt Gelling Agent

A 4-neck reaction flask was used, equipped with a thermometer, mechanical stirrer, condenser and gas ($N_2$) inlet. In the flask, 43.44 grams of aluminum sulfate hydrate and 100 grams of toluene were added to 100 grams of the dialkyl phosphate prepared in accordance with Example 4 above. Approximately 20 mL of water were collected in azeotrope at 95 to about 115–120° C. Thereafter, the mixture was permitted to cool and a clear solution was produced. The resultant gelling agent was clear and pourable after two days at −10° F. The gelling agent also mixed well and gelled at −10° F. in kerosene.

EXAMPLE 6

Liquid Aluminum Phosphate Salt Gelling Agent

A 4-neck reaction flask was used, equipped with a thermometer, mechanical stirrer, condenser and gas ($N_2$) inlet. In the flask, 139.8 grams of aluminum sulfate hydrate, 81.0 grams of toluene, 243.0 grams of aromatic naptha, and 0.14 grams of an antifoamer were added to 324.0 grams of the dialkyl phosphate prepared in accordance with Example 4 above. Approximately 40 mL of water were collected in azeotrope at about 115–120° C. Thereafter, the mixture was permitted to cool and a clear solution was produced.

EXAMPLE 7

The liquid aluminum phosphate gelling agent prepared in accordance with Example 5 above, was activated with a 50% (volume) IPA/triethanolamine solution and mixed with kerosene. The pour point of the gelling agent and the activator were well below 0° F. The ratio of P:Al in the gelling agent was 3.2:1. Fourteen gallons per thousand of the gelling agent gave 56 centipoise viscosity initially at room temperature and about 185 centipoise at 300° F. Chilled samples of kerosene at about 10° F. or less were successfully gelled using this gelling agent. Furthermore, hydrocarbon gels were formed at very low stirring speeds in a blender.

EXAMPLE 8

The liquid aluminum phosphate salt gelling agent produced in accordance with Example 3 above was activated with triethanolamine to gel kerosene. The gel produced significant viscosity in 5–60 seconds after activation.

While I have shown and described several embodiments in accordance with my invention, it is to be clearly understood that the same are susceptible to numerous changes apparent to one skilled in the art. Therefore, I do not wish to be limited to the details shown and described but intend to show all changes and modifications which come within the scope of the appended claims.

What is claimed is:

1. A method of fracturing an oil well which comprises:
   pumping (A) a liquid hydrocarbon; (B) a liquid aluminum phosphate salt gelling agent comprising the reaction product of dialkyl phosphate formed from the reaction product of (1) a polyphosphate intermediate produced by reacting triethyl phosphate and phosphorous pentoxide and (2) a mixture of $C_6$ to $C_{10}$ aliphatic alcohols, an aluminum sulfate, and a solvent; (C) an activator; and (D) a proppant material, into a well bore; and
   mixing said gelling agent, activator and proppant material with said hydrocarbon as they are being pumped downhole thereby forming a gelled hydrocarbon; whereby premixing of said hydrocarbon, gelling agent and activator prior to being pumped into said well bore is eliminated.

2. The method according to claim 1 wherein said dialkyl phosphate is formed from the reaction product of (1) a polyphosphate intermediate produced by reacting triethyl phosphate and phosphorous pentoxide, and (2) a mixture of $C_6$ to $C_{10}$ linear alcohols and hexanol.

3. The method according to claim 1 wherein said aluminum sulfate is aluminum sulfate hydrate.

4. The method according to claim 1 wherein said activator is triethanolamine.

5. The method according to claim 1 wherein said solvent is at least one compound selected from the group consisting of toluene, xylene and aromatic naphtha.

* * * * *